May 3, 1966     D. M. SWITHENBANK     3,249,382
DETACHABLE CARGO BOX
Filed March 10, 1964     2 Sheets-Sheet 1
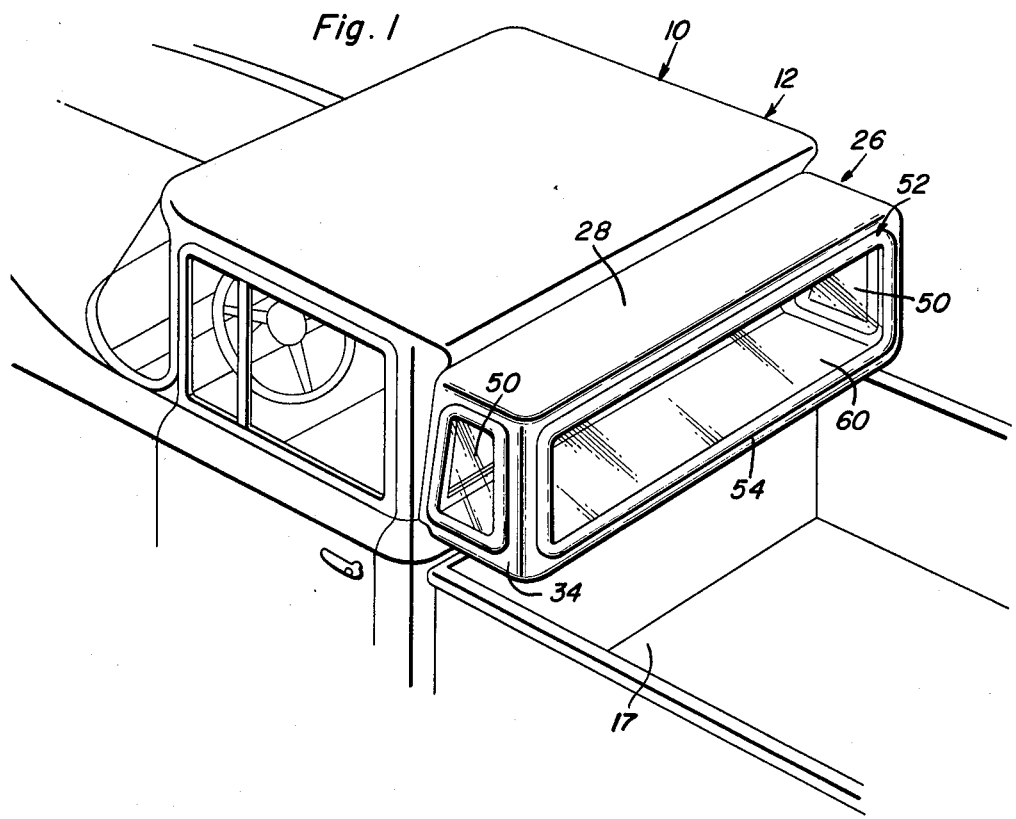
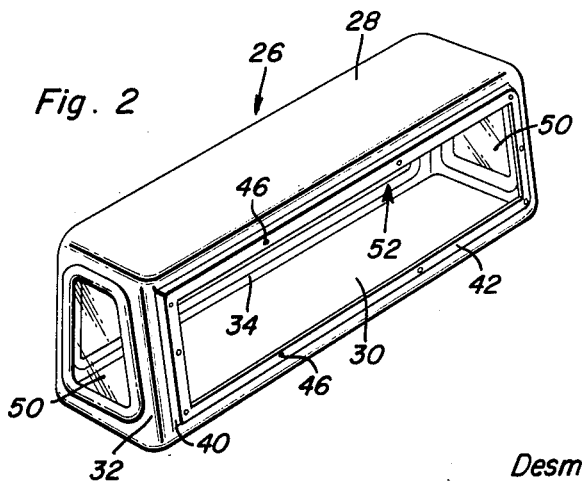
Desmond M. Swithenbank
INVENTOR.
BY *Clarence A. O'Brien*
and *Harvey B. Jackson*
Attorneys

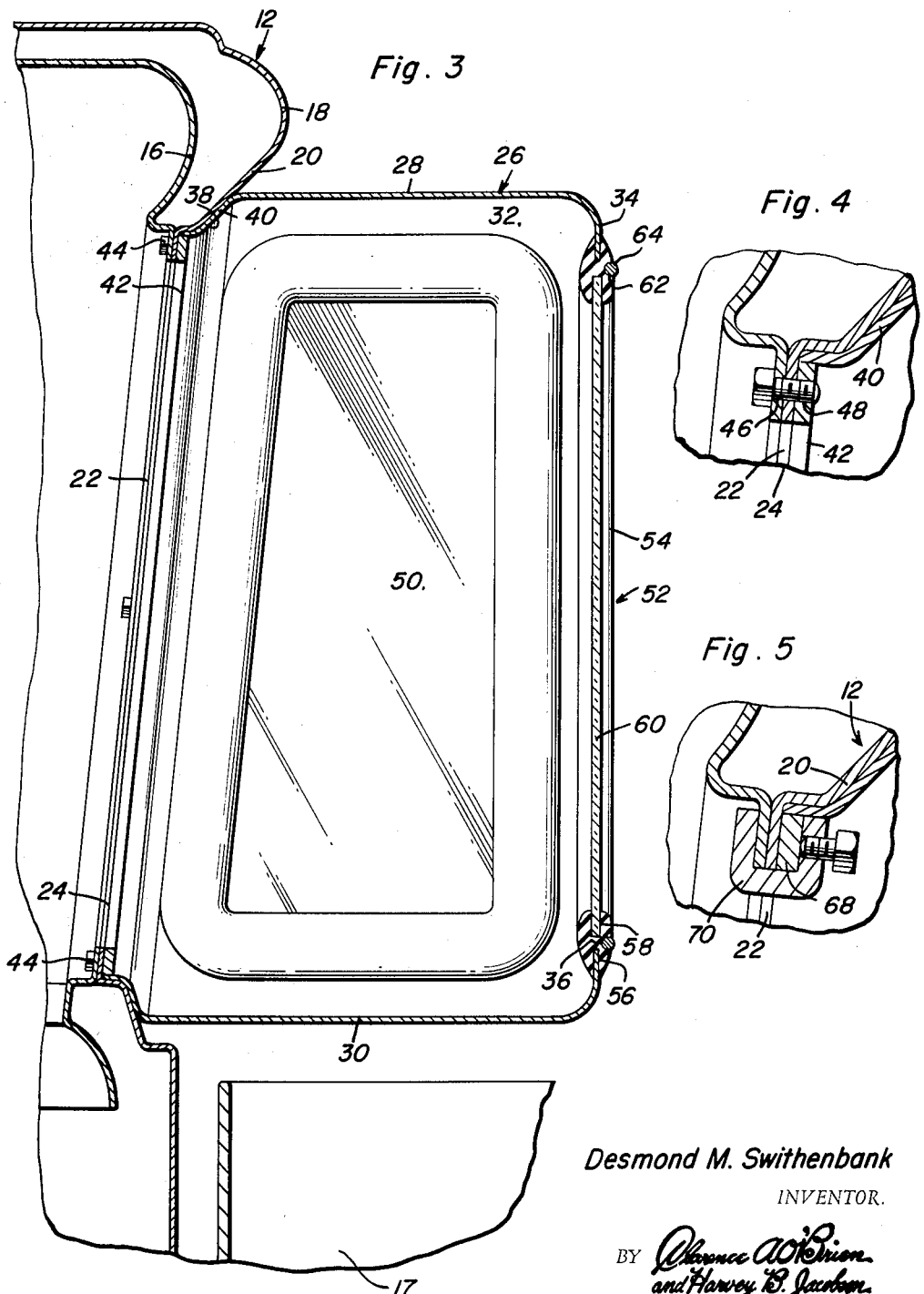

United States Patent Office 3,249,382
Patented May 3, 1966

3,249,382
DETACHABLE CARGO BOX
Desmond M. Swithenbank, Star Rte., Sproul Creek, Garberville, Calif.
Filed Mar. 10, 1964, Ser. No. 350,851
5 Claims. (Cl. 296—24)

This invention relates to a novel and useful detachable cargo box and more specifically to a housing-like member which is open at one end and is adapted to be disposed with its open end removably secured in the rear window opening of the cab of a truck with the housing-like member projecting rearwardly of the cab. When the detachable cargo box of the instant invention is removably secured within the rear window opening of the vehicle cab, the conventional rear window assembly is removed. In addition, the end of the detachable cargo box remote from the open end thereof has a window assembly therein whereby the driver of the vehicle may still gaze rearwardly through the rear window opening of the cab of the vehicle and through the detachable cargo box in order to view the area disposed rearwardly of the vehicle.

The main object of this invention is to provide an assembly which may be secured to the rear wall of a pickup truck cab or the like and communicated with the interior of the cab through the conventional rear window thereof whereby it may be utilized as a weatherproofed small cargo space that can be reached from the driver's seat of the vehicle. It is to be understood that the cargo box of the instant invention will be large enough for small cases, parcels, guns, fishing tackle, etc.

Another object of this invention is to provide a cab extension or cargo box that may be readily constructed so as to be adapted for securement in the rear window opening of substantially any type of vehicle cab.

Another object of this invention is to provide a cab extension or cargo box including a window in the rear wall thereof remote from the open forward end of the cargo box whereby the driver of the vehicle may still view the area disposed to the rear of the truck by gazing through the rear window opening in the rear wall of the cab of the vehicle and through the cargo box rear window.

Yet another object of this invention is to provide the cab extension or cargo box with a rear window that is removably secured within a window opening formed in the rear wall of the cargo box and is of a size and shape conforming to the rear window opening of the cab of the vehicle and which further includes mounting means for selectively mounting the rear window in the window opening in the rear wall of the cargo box when the latter is secured to the cab of the vehicle and in the rear window opening of the rear wall of the cab of the vehicle when the cab extension or cargo box is removed.

Still another object of this invention is to provide the forward end of the cab extension or cargo box with a reduced neck portion which is adapted to be snugly received within the rolled and recessed portion of the rear wall of the cab of a truck disposed about the rear window opening formed therein and to receive support from the rolled portions of the rear wall of the vehicle cab.

A final object of this invention to be specifically enumerated herein is to provide a cab extension or cargo box in accordance with the preceding objects which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional form of pickup truck shown with the cab extension or cargo box of the instant invention mounted thereon;

FIGURE 2 is a perspective view of the cargo box;

FIGURE 3 is a fragmentary enlarged longitudinal vertical sectional view taken substantially upon a plane passing through the center of the pickup truck cab and cargo box;

FIGURE 4 is a further enlarged fragmentary longitudinal vertical sectional view showing the manner in which the cargo box may be secured within the rear window opening of the cab of the vehicle; and FIGURE 5 is a fragmentary longitudinal vertical sectional view similar to that of FIGURE 4 but showing a second manner of removably securing the cargo box within the rear window opening of the vehicle cab.

Referring now more specifically to the drawings the numeral 10 generally designates a conventional form of pickup truck which includes a cab enclosure generally referred to by the reference numeral 12 including a rear wall portion 16 and which is disposed forwardly of and projects upwardly above the load bed portion 17 of the truck 10. The rear wall portion 16 includes an outer panel member 18 with forwardly and inwardly rolled portions 20 disposed about and defining a rear window opening 22 in the rear wall 16. The outer panel 18 includes inwardly directed flange means 24 which extend about the opening 22 and project inwardly thereof.

The cargo box or cab extension of the instant invention is generally designated by the reference numeral 26 and includes top and bottom walls 28 and 30 and opposite side walls 32 and 34. The cargo box 26 also includes a partial rear wall 34 which defines a window opening 36.

The forward end of the cargo box 26 includes a reduced neck portion 38 defined by forwardly and inwardly directed portions 40 which terminate at their inner ends in a frame-like flange-defining member 42 which is secured in the open of the cargo box 26. The inner marginal portions of the flange-defining member 42 defines the open end of the cargo box 26 and it may be seen that the neck portion 38 is snugly received within the forwardly recessed portion of the outer panel 18 disposed about the opening 22 defined by the inwardly curved or rolled portions 20. Further, it may be seen that the forward space of the flange-defining member 42 abuts against the rear face of the flange means 44 and that a plurality of fasteners 44 are passed through apertures 46 formed through the flange means 24 and threadedly secured in a plurality of threaded bores 48 formed in the flange-defining member 42. Further, it may be seen that the outer surfaces of the neck portion 38 are disposed in surface-to-surface contacting relation with portions of the outer surfaces of the rolled or curled portions 20 of the outer panel 18 whereby the housing 26 will be supported from the portions of the outer panel 18 disposed about the opening 22 as well as from the flange means 24.

It may be seen that each of the side walls 32 and 34 includes a window opening in which a window assembly 50 is secured and that a rear window assembly generally referred to by the reference numeral 52 is secured in the rear window opening 36. The assembly 52 includes a peripheral resilient mounting frame 54 having an outwardly opening circumferential groove 56 formed therein which the portions of the rear wall 34 disposed about the opening 36 are received. In addition, the inner portion of the peripheral resilient mounting frame 54 has a circumferential inwardly opening groove 58 formed therein in which a window pane 60 is received. Still further, the outer face of the mounting frame 54 has a circumferential rearwardly opening groove 62 formed therein and a circumferential locking bead 64 is removably secured in the groove 62. When it is desired, the bead 64 may be removed whereupon the window assembly 52 may be removed from the window opening 36. If it is desired, the cargo box 26 may be removed from the opening 22 and the window assembly 52 may be secured in the window opening 22 in lieu of the window opening 36.

With attention now directed more specifically to FIGURE 5 of the drawings, there may be seen a modified form of flange-defining member 68 corresponding to the flange-defining member 42 but which does not have threaded bores formed therethrough. In the event it is desired to use the flange-defining member 68 in lieu of the flange-defining member 42, a plurality of C-shaped clamp assemblies 70 may be spaced about the opening 22 and utilized to clampingly secure the cargo box 26 within the rear window opening 22 of the cab 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a vehicle including a vehicle cab portion disposed forwardly of a load bed of said vehicle and including a rigid stationary rear panel member defining a window opening therein disposed above said load bed, the portions of said rigid panel member defining said opening including flange means disposed about and projecting into said opening, said flange means being recessed inwardly of the rear side face of said panel member, a short, rigid and detachable housing including one open end including inwardly directed flanges disposed thereabout, said open end of said housing being reduced in cross-sectional area and being received in the recessed portion of said panel member with said inwardly directed flanges abutting said flange means and removably secured to the latter for support therefrom and support of said housing independently of said load bed.

2. The combination of claim 1 wherein said inwardly directed flanges and said flange means are secured together by means of fasteners removably secured therethrough.

3. The combination of claim 1 wherein said inwardly directed flanges and said flange means are removably secured together by means of a plurality of clamp members disposed about said opening and clampingly securing said inwardly directed flanges and said flange means together.

4. The combination of claim 1 wherein the rear end of said housing remote from said open end includes means defining a window opening, a window construction secured in the last-mentioned window opening.

5. The combination of claim 4 wherein said housing includes opposite side walls each including a window having a plan area greater than one-half the plan area of the corresponding side wall.

References Cited by the Examiner
UNITED STATES PATENTS

| | | | |
|---|---|---|---|
| 1,513,227 | 10/1924 | Cornelius et al. | 296—26 X |
| 1,653,775 | 12/1927 | Lose | 312—101 |
| 1,751,851 | 3/1930 | Bennett | 312—101 |
| 2,358,172 | 9/1944 | Lindsay | 296—28 |
| 2,530,097 | 11/1950 | Troth | 296—24 |
| 2,848,271 | 8/1958 | Reilly | 296—37 |
| 2,971,794 | 2/1961 | Garcia | 296—26 |

BENJAMIN HERSH, *Primary Examiner.*

GEORGE E. LOWRANCE, *Examiner.*